Feb. 25, 1930.  E. S. AVERY  1,748,100
COATED PULLEY
Filed Jan. 26, 1928
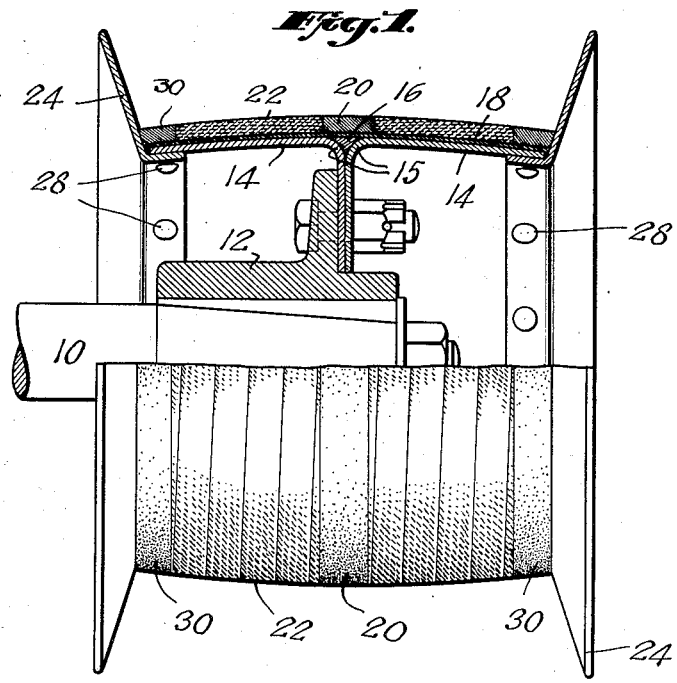
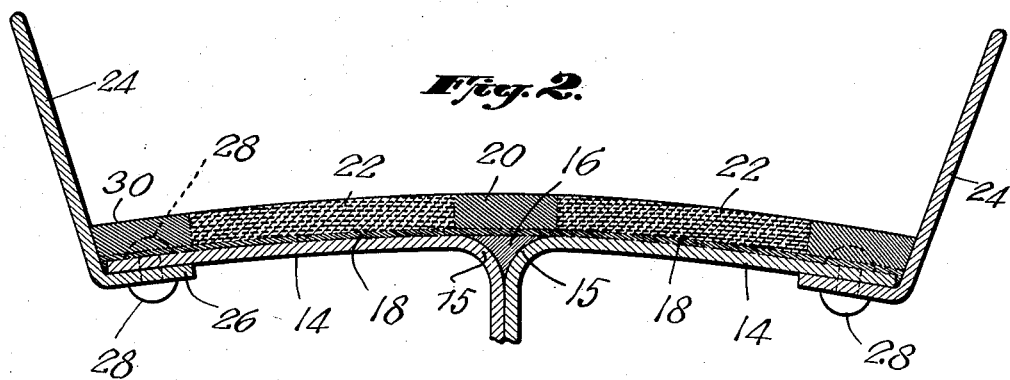
INVENTOR
Edward S. Avery
BY
ATTORNEY Patented Feb. 25, 1930

1,748,100

UNITED STATES PATENT OFFICE

EDWARD S. AVERY, OF EAST HAMPTON, NEW YORK

COATED PULLEY

Application filed January 26, 1928. Serial No. 249,559.

In a co-pending application Serial No. 249,844, filed January 27, 1928, I have shown and described an improved pulley composed of complementary belt engaging parts detachably secured to the relatively massive hub portion. The present application is directed to an improved covering peculiarly well suited for such a pulley though I am not limited to any exact form of pulley. The present invention will be apparent from the following specification when read in connection with the accompanying drawings in which—

Fig. 1 is a face view of a pulley with the upper portion shown in section;

Fig. 2 is an enlarged typical transverse section through the rim of my improved pulley.

Referring in detail to the drawings, 10 represents a shaft to which is keyed or otherwise secured to a suitable central hub 12 which in turn has detachably secured thereto the belt engaging portion of the pulley. This belt engaging portion in the embodiment of the invention illustrated is formed of two shell-like pressed metal members 14—14 arranged back to back as shown. The corners of these members are rounded as indicated at 15—15. Because of these rounding fillets of the cup shaped members an annular void is formed at the outer portion of the pulley shells. In the embodiment of the invention illustrated, I fill this void with a body of rubber as indicated at 16. This rubber is preferably, though not necessarily, formed integral with a thin layer 18 of rubber which covers the entire face of both the members 14—14. This layer may be secured in any manner known in the art but I prefer, however, to form an extremely intimate bond by plating the rim with an alloy of copper, zinc, antimony and then vulcanizing the thin layer of rubber 18 directly to this plated surface. This will give an extremely tenacious and intimate bond between the rubber and the metal.

In the central zone of the face of the pulley, I provide a relatively thick annular band 20 of rubber, this body being intimately secured, for example, by vulcanization to the thin layer 18.

On each side of the band 20, I provide a rubberized fabric band 22. In the completed structure this band is intimately secured to the rubber layer 18 and also to the central band of rubber 20. The pulley illustrated is provided with flaring side flanges 24 each having an inwardly bent annular portion 26 which is secured to the rim 14 by rivets 28. To cover the heads of the rivets 28 I preferably provide at each side of the pulley an annular band 30 which is secured both to the thin rubber layer 18 and the adjacent fabric band 22. It is to be understood, however, that in some cases the rivets 28 may be counter-sunk and the rubber bands 30 omitted.

The pulley described is particularly well suited for out-of-door use where it is exposed to the elements. Being of rubber and rubberized fabric the surface will not become oxidized. Moreover, snow and sleet will not readily adhere thereto. The pulley is particularly well suited for use in car-lighting service and is adapted to be secured either to the axle or to the car-lighting dynamo. In such service it is important that an effective non-slip belt engaging surface be provided and it is also important that any covering employed will not be destroyed by action of water or melting snow or ice. The pulley shown meets these requirements. The fabric bands readily withstand severe service and the more resilient rubber portions such as 20 and 30 in service are compressed so as to squeeze out any entrained moisture in the event that the joint between the rubber and the fabric should rupture at different points in service.

The annular central band 20 and rubber body 16 which fills the void between the two metallic shell-like portions of the pulley provides a highly resilient crown which in service is slightly compressible. This provides an arrangement in which the belt is in driving engagement with the pulley over a relatively greater transverse width than would be the case where the center of the pulley is not so compressed. This resilient center, therefore, provides a pulley in which a greater tractive area is presented to the belt by the pulley. With the usual belt running on the usual crowned metal pulley either the belt must stretch to fit the crown of the pulley or parts of the belt must ride so loosely on the face of the pulley as to transmit little or no power. That is to say, the usual belt running over the usual form of metal pulley must either stretch to conform to the contour of the crowning or failing to so stretch, parts of it will not be doing useful work. My improved pulley having a central deformable or yielding portion overcomes the objections in the usual form of pulley because under load, the central crowned portion yields slightly. This permits of a greater effective transverse length of the belt to grip. The fabric portions at each side of the center have a high coefficient of friction thus increased tractive area is secured.

Various modifications may be made and the descriptive matter is intended to be construed in an illustrative rather than a limiting sense.

What I claim is:—

1. A pulley having a metallic rim coated with a thin layer of rubber, a separate rubberized fabric band on each side of the center of the pulley face and an annular deformable body between said fabric bands.

2. A pulley having a metallic rim coated with a thin layer of rubber, a separate rubberized fabric band on each side of the center of the pulley face and an annular body of rubber between said fabric bands, pressed metal flanges secured to said rim and bands of rubber between said fabric bands and said flanges.

3. A pulley having a metallic rim coated with a thin layer of rubber, a separate rubberized fabric band on each side of the center of the pulley face and an annular body of rubber between said fabric bands, pressed metal flanges riveted to said rim and bands of rubber adjacent said flanges and covering the heads of the rivets which secure the flanges to the rim.

4. A pulley having a metallic rim portion formed of two shell-like bodies, a thin layer of rubber secured to said rim, an annular body of rubber and rubberized fabric bands secured to said thin layer adjacent said annular body, sheet metal flanges riveted to said shell-like bodies and annular bodies of rubber adjacent said flanges covering the rivet heads and secured to said thin layer and to said fabric.

5. A pulley including two shell-like bodies arranged back to back and providing a rim portion with an annular void between them, a thin layer of rubber secured to the rim portion of said shell-like bodies and including a body of rubber filling said annular void, and a pulley covering secured to said thin layer including a body of rubberized fabric.

6. A pulley including two shell-like bodies arranged back to back and providing a rim portion with an annular void between them, a thin layer of rubber secured to the rim portion of said shell-like bodies and including a body of rubber filling said annular void, and a pulley covering comprising an annular band of rubber encircling said annular void and rubberized fabric bands secured to said thin layer adjacent said annular band.

7. A pulley including two shell-like bodies arranged back to back and providing a rim portion with an annular void between them, a thin layer of rubber secured to the rim portion of said shell-like bodies and including a body of rubber filling said annular void, and a pulley covering comprising an annular band of rubber encircling said annular void and rubberized fabric bands secured to said thin layer adjacent said annular band, sheet metal flanges riveted to said shell-like bodies. and annular bodies of rubber adjacent said flanges covering the rivet heads and secured to said thin layer.

8. A pulley including a pair of shell-like bodies arranged back to back, a thin layer of rubber secured to the peripheral face of said shell-like bodies, a relatively thicker annular body of resilient material encircling the joint between said bodies and a band of rubberized fabric on each side of said annular body of resilient material.

9. A pulley having a metallic rim, a separate rubberized fabric band secured on each side of the center of the pulley face and an annular deformable body between said fabric bands.

10. A pulley having a metallic rim, a separate fabric band secured to the pulley on each side of the center of the face thereof and an annular deformable body of rubber secured to the central portion of the pulley between said fabric bands.

11. A pulley having a metallic rim coated with a thin layer of rubber, the face of the pulley having a covering comprising two laterally spaced annular bodies of rubber secured to said thin layer and a fabric band between them.

12. A pulley including a pair of shell-like bodies arranged back to back, a thin layer of rubber secured to the peripheral face of said shell-like bodies, at least two relatively thick annular bands of resilient material secured to said thin layer of rubber and a band of rubberized fabric secured to said thin layer of rubber and filling the space between said annular bands.

In witness whereof, I have hereunto signed my name.

EDWARD S. AVERY.